United States Patent
Bonzini et al.

(10) Patent No.: US 9,886,376 B2
(45) Date of Patent: Feb. 6, 2018

(54) HOST VIRTUAL ADDRESS RESERVATION FOR GUEST MEMORY HOT-PLUGGING

(71) Applicant: Red Hat Israel, Ltd., Raanana (IL)

(72) Inventors: Paolo Bonzini, Turate (IT); Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 89 days.

(21) Appl. No.: 14/812,658

(22) Filed: Jul. 29, 2015

(65) Prior Publication Data
US 2017/0031810 A1    Feb. 2, 2017

(51) Int. Cl.
G06F 12/02    (2006.01)
G06F 12/10    (2016.01)
G06F 9/455    (2006.01)
G06F 12/109   (2016.01)

(52) U.S. Cl.
CPC ........ G06F 12/023 (2013.01); G06F 9/45558 (2013.01); G06F 12/109 (2013.01); G06F 2009/45562 (2013.01); G06F 2212/1044 (2013.01); G06F 2212/152 (2013.01); G06F 2212/657 (2013.01)

(58) Field of Classification Search
CPC ... G06F 12/023; G06F 12/109; G06F 9/45558
See application file for complete search history.

(56) References Cited

U.S. PATENT DOCUMENTS

| | | | |
|---|---|---|---|
| 7,089,377 B1 * | 8/2006 | Chen | G06F 12/109 703/27 |
| 7,657,872 B2 | 2/2010 | Kelbaugh et al. | |
| 7,730,005 B2 | 6/2010 | Gilliam et al. | |
| 7,783,858 B2 * | 8/2010 | Chiang | G06F 12/1036 711/170 |
| 7,873,711 B2 * | 1/2011 | Adams | G06F 9/5077 709/220 |

(Continued)

OTHER PUBLICATIONS

Fogbugz Documentation Licensed Version 8.8.53, fogcreek.com, 178 pages (last accessed Jul. 30, 2015) http://www.fogcreek.com/fogbugz/documentation/.

(Continued)

*Primary Examiner* — Charles Rones
*Assistant Examiner* — Tian-Pong Chang
(74) *Attorney, Agent, or Firm* — Lowenstein Sandler LLP (57) ABSTRACT

An example method for host virtual address reservation comprises: reserving a host virtual address range within a virtual address space of a computer system; associating a first virtual memory device with a first guest physical address range a virtual machine running on the computer system; associating a second virtual memory device with a second guest physical address range of the virtual machine; mapping a first guest physical address of the first guest physical address range to a first host virtual address of the host virtual address range, wherein the first host virtual address is identified by an offset with respect to the first guest physical address; mapping a second guest physical address of the second guest physical address range to a second host virtual address of the host virtual address range, wherein the second host virtual address is identified by the offset with respect to the second guest physical address.

17 Claims, 4 Drawing Sheets

(56) References Cited

U.S. PATENT DOCUMENTS

| | | | |
|---|---|---|---|
| 8,392,628 B2 * | 3/2013 | Santos | G06F 12/1081 710/22 |
| 8,584,120 B2 * | 11/2013 | Urbach | G06F 9/44521 717/171 |
| 8,615,741 B2 | 12/2013 | Hudson | |
| 9,152,570 B2 * | 10/2015 | Mehta | G06F 12/1027 |
| 9,274,974 B1 * | 3/2016 | Chen | G06F 12/109 |
| 9,317,312 B2 * | 4/2016 | Kondo | G06F 9/45533 |
| 2009/0187453 A1 | 7/2009 | Dill et al. | |
| 2010/0191731 A1 | 7/2010 | Rus et al. | |
| 2010/0235807 A1 | 9/2010 | Doddappa et al. | |
| 2011/0238768 A1 | 9/2011 | Habets et al. | |
| 2014/0173737 A1 | 6/2014 | Toback et al. | |

OTHER PUBLICATIONS

"Developer's Guide—OpenStack Project Infrastructure Manual 0.0.1.'", openstack.org, 13 pages (last accessed Jul. 30, 2015) https://wiki.openstack.org/wiki/GerritJenkinsGit.

Basu, Arkaprava, et al. "Efficient Virtual Memory for Big Memory Servers", ISCA 2013, Tel Aviv, Israel, 12 pages.

Red Hat Enterprise Linux 7 7.0 Release Notes, Red Hat, Inc., Red Hat Customer Content Services, 2014 90 pages.

"Re: [Patch] vhost: support upto 509 memory regions" gmane.org, Feb. 17, 2015, 1 page http://article.gmane.org/gmane.linux.kernel/1889580.

Sharif, Monirul et al., "Secure In-VM Monitoring Using Hardware Virtualization", CCS 2009, Chicago, IL, Nov. 9-13.

Petersson, Mats "Re: CR3 Virtual Address", gmane.org, Nov. 28, 2012, 3 pages.

\* cited by examiner

HOST VIRTUAL ADDRESS RESERVATION FOR GUEST MEMORY HOT-PLUGGING

TECHNICAL FIELD

The present disclosure is generally related to virtualized computer systems, and is more specifically related to systems and methods for host virtual address reservation for guest memory hot-plugging.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for host virtual address reservation for guest memory hot-plugging.

Certain processor architectures support virtualization by providing special instructions for facilitating virtual machine execution. In certain implementations, a processor may support executing a hypervisor (also referred to as "virtual machine monitor") that acts as a host and has full control of the processor and other platform hardware. A hypervisor presents a virtual machine with an abstraction of one or more virtual processors. A hypervisor is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. The software executing in a virtual machine is executed at the reduced privilege level so that the hypervisor can retain control of platform resources.

A notable feature supported by certain hardware-assisted virtualization implementations is a second level address translation mechanism to facilitate guest-to host address translation. The guest operating system may maintain a page table hierarchy comprising the page directory and a set of page tables to facilitate the translation of virtual addresses into physical addresses. By treating a guest physical address as a host virtual address, the hardware page table walker can view the host page table as nested within the guest page table hierarchy.

In an illustrative example, guest applications being executed by a virtual machine may reference memory locations using guest virtual addresses. Responsive to receiving a memory access request, the processor may translate the referenced guest virtual address to a guest physical address using a guest page table that is managed by the guest operating system. The processor may then translate the guest physical address to the corresponding host virtual address, e.g., using an extended page table (EPT) that is managed by the hypervisor.

In certain implementations, a host computer system running one or more virtual machines may support guest memory hot-plugging, i.e., on-the-fly associating virtual memory devices with a running virtual machine. In an illustrative example, a hypervisor may notify a virtual machine of a new virtual memory device through a memory hot-plug manager device described in an Advanced Configuration and Power Interface (ACPI) table, such as a Differentiated System Description Table (DSDT) or a Supplementary System Description Table (SSDT).

After associating a virtual memory device with a running virtual machine, the hypervisor may map the starting address of the guest physical address range assigned to the newly hot-plugged virtual memory device to a host virtual address. Performing multiple hot-plugging operations may result in a linear growth of a memory data structure employed to store the guest physical address to host virtual address mappings. On the other hand, lookup operations with respect to the memory data structure may be performance-critical for certain input/output (I/O)-intensive applications.

Aspects of the present disclosure address the above noted and other deficiencies by providing methods and systems for host virtual address reservation for guest memory hot-plugging. In accordance with one or more aspects of the present disclosure, the hypervisor may, responsive to starting a virtual machine, reserve a virtual address range within the virtual address space of the host computer system, such that the virtual address range is large enough to accommodate all guest memory that may be eventually added by hot-plugging virtual memory devices into the virtual machine. Such address space reservation may be performed without associating any physical memory with at least part of the reserved address range.

Responsive to hot-plugging a virtual memory device into a virtual machine, the hypervisor may associate the virtual memory device with a guest physical address range within the physical address space of the virtual machine: the starting address of the allocated guest physical address range may be mapped to a host virtual address residing within the reserved virtual address range, such that the offset between the host virtual addresses and the corresponding guest physical addresses would remain the same for all virtual memory devices that would be eventually hot-plugged into the virtual machine.

Hence, mappings to host virtual address ranges of two or more adjacent guest physical address ranges corresponding to two or more virtual memory devices (that may be hot-plugged into a virtual machine at different times) may be coalesced into large contiguous host virtual address ranges, thus reducing the size the memory data structure employed to store the guest physical address to host virtual address mappings, and hence increasing the memory access efficiency.

Various aspects of the above referenced methods and systems are described in details herein below by way of examples, rather than by way of limitation.

Figure 1:
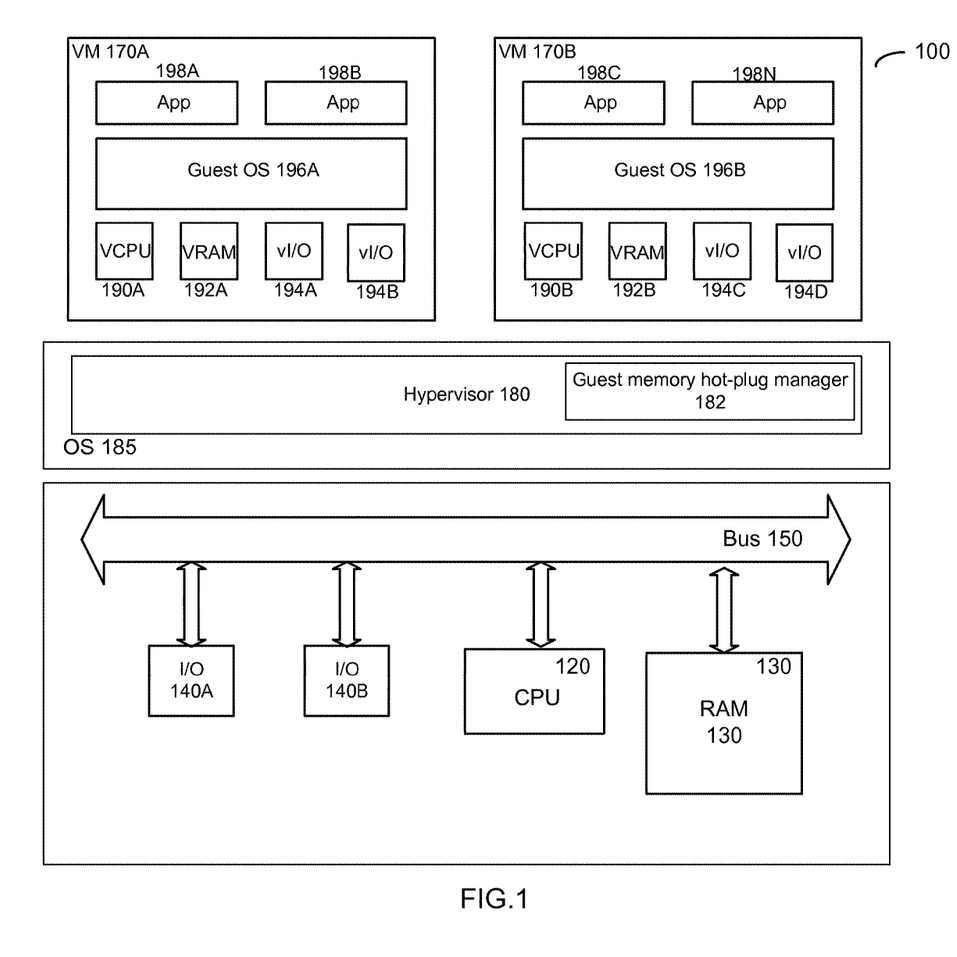
FIG. 1 depicts a high-level component diagram of an example computer system implementing the methods for host virtual address reservation for guest memory hot-plugging, in accordance with one or more aspects of the present disclosure.

FIG. 1 depicts a high-level component diagram of an illustrative example of a computer system 100 operating in accordance with one or more aspects of the present disclosure. Computer system 100 may include one or more processors 120 communicatively coupled to memory devices 130 and input/output (I/O) devices 140 via a system bus 150.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

Computer system 100 may run one or more virtual machines 170A-170B, by executing a software layer 180, often referred to as "hypervisor," above the hardware and below the virtual machines, as schematically illustrated by FIG. 1. In one illustrative example, hypervisor 180 may be a component of operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors, memory, and I/O devices, and present this abstraction to virtual machines 170A-170B as virtual devices. A virtual machine 170 may execute a guest operating system 196 which may utilize underlying virtual processors (also referred to as virtual central processing units (vCPUs)) 190, virtual memory 192, and virtual I/O devices 194. One or more applications 198A-198N may be running on a virtual machine 170 under guest operating system 196.

In various illustrative examples, processor virtualization may be implemented by the hypervisor scheduling time slots on one or more physical processors for a virtual machine, rather than a virtual machine actually having a dedicated physical processor. Device virtualization may be implemented by intercepting virtual machine memory read/write and/or input/output (I/O) operations with respect to certain memory and/or I/O port ranges, and by routing hardware interrupts to a virtual machine associated with the corresponding virtual device.

Processor 120 may support hardware-assisted virtualization by implementing a second level address translation mechanism to facilitate guest-to host address translation. Guest operating system 196 may maintain a page table hierarchy comprising the page directory and a set of page tables to facilitate the translation of virtual addresses into physical addresses. By treating a guest physical address as a host virtual address, the hardware page table walker of processor 120 can view the host page table as nested within the guest page table hierarchy.

In an illustrative example, guest application 198A may reference memory locations using guest virtual addresses (e.g., represented by guest linear addresses). Responsive to receiving a memory access request, the processor may translate the referenced guest virtual address to a guest physical address using a guest page table that is managed by guest operating system 196A. The processor may then translate the guest physical address to the corresponding host physical address using an extended page table (EPT) that is managed by hypervisor 180. Extended page table pointer (EPTP) field of the virtual machine control structure (VMCS) holds the physical address of the extended page table.

In certain implementations, a host computer system running one or more virtual machines may support guest memory hot-plugging, i.e., on-the-fly associating virtual memory devices with a running virtual machine. In accordance with one or more aspects of the present disclosure, hypervisor 180 may include a guest memory hot-plug manager component 182 which may perform the methods for host virtual address reservation for guest memory hot-plugging, as described in more details herein below. In certain implementations, guest memory hot-plug manager component 182 may be implemented as a software component invoked by hypervisor 180, and may comprise one or more code modules that implement method 300 described herein below and various auxiliary functions. Alternatively, functions of guest memory hot-plug manager component 182 may be performed by hypervisor 180.

In an illustrative example, responsive to hot-plugging a virtual memory device into a virtual machine, the hypervisor may notify the virtual machine of a newly added virtual memory device through a memory hot-plug manager device described in an Advanced Configuration and Power Interface (ACPI) table, such as a Differentiated System Description Table (DSDT) or a Supplementary System Description Table (SSDT).

Figure 2:
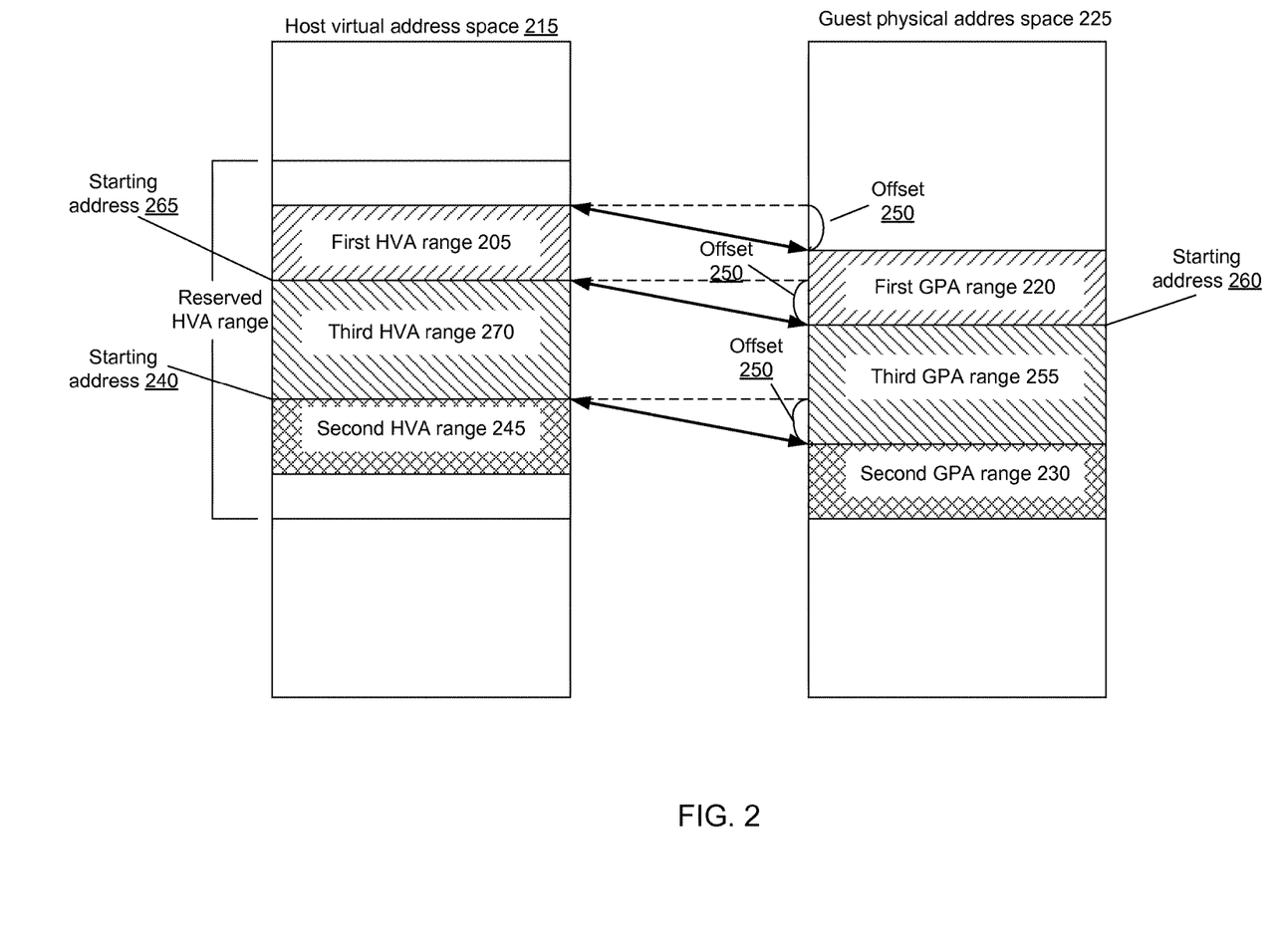
FIG. 2 schematically illustrates an example of mapping guest physical address ranges associated with hot-plugged virtual memory devices to host virtual address ranges, in accordance with one or more aspects of the present disclosure.

FIG. 2 schematically illustrates an example of mapping guest physical address ranges associated with hot-plugged virtual memory devices to host virtual address ranges, in accordance with one or more aspects of the present disclosure. As schematically illustrated by FIG. 2, the hypervisor may, responsive to starting a virtual machine, reserve a host virtual address range 210 within virtual address space 215 of the host computer system, such that host virtual address range 210 is large enough to accommodate all guest memory that may be eventually added by hot-plugging virtual memory devices into the virtual machine. Such address space reservation may be performed without associating any physical memory with at least part of reserved address range 210. In an illustrative example, upon the virtual machine startup, the hypervisor may map a first range 205 within the reserved host virtual address range 210 to a guest physical address range 220 allocated to a virtual memory device associated with the virtual machine within the guest physical address space 225. The mappings of guest physical addresses within guest physical address range 220 to corresponding host virtual addresses within host virtual address range 205 may be stored in a memory data structure, such as an extended page table (EPT).

In an illustrative example, responsive to hot-plugging a virtual memory device into the virtual machine, the hypervisor may associate the virtual memory device with a guest physical address range 230 within physical address space 225 of the virtual machine: the starting address 235 of allocated guest physical address range 230 may be mapped to a starting address 240 of a host virtual address range 245 residing within reserved host virtual address range 210, such that the offset 250 between the host virtual addresses and the corresponding guest physical addresses would remain the same for all virtual memory devices are hot-plugged into the virtual machine.

In another illustrative example, responsive to hot-plugging another virtual memory device into the virtual machine, the hypervisor may associate the second virtual memory device with a guest physical address range 255 within physical address space 225 of the virtual machine: the starting address 260 of allocated guest physical address range 255 may be mapped to a starting address 265 of a host virtual address range 270 residing within reserved host virtual address range 210, such that the offset 250 between the host virtual addresses and the corresponding guest physical addresses would remain the same for all virtual memory devices are hot-plugged into the virtual machine.

Hence, mappings to host virtual address ranges 205, 220, 245 of two or more adjacent guest physical address ranges 220, 230, 255 corresponding to the three virtual memory devices (that have been hot-plugged into a virtual machine at different times) becomes coalesced into a contiguous host virtual address range 275, thus reducing the size the memory data structure employed to store the guest physical address to host virtual address mappings, and increasing the memory access efficiency.

Figure 3:
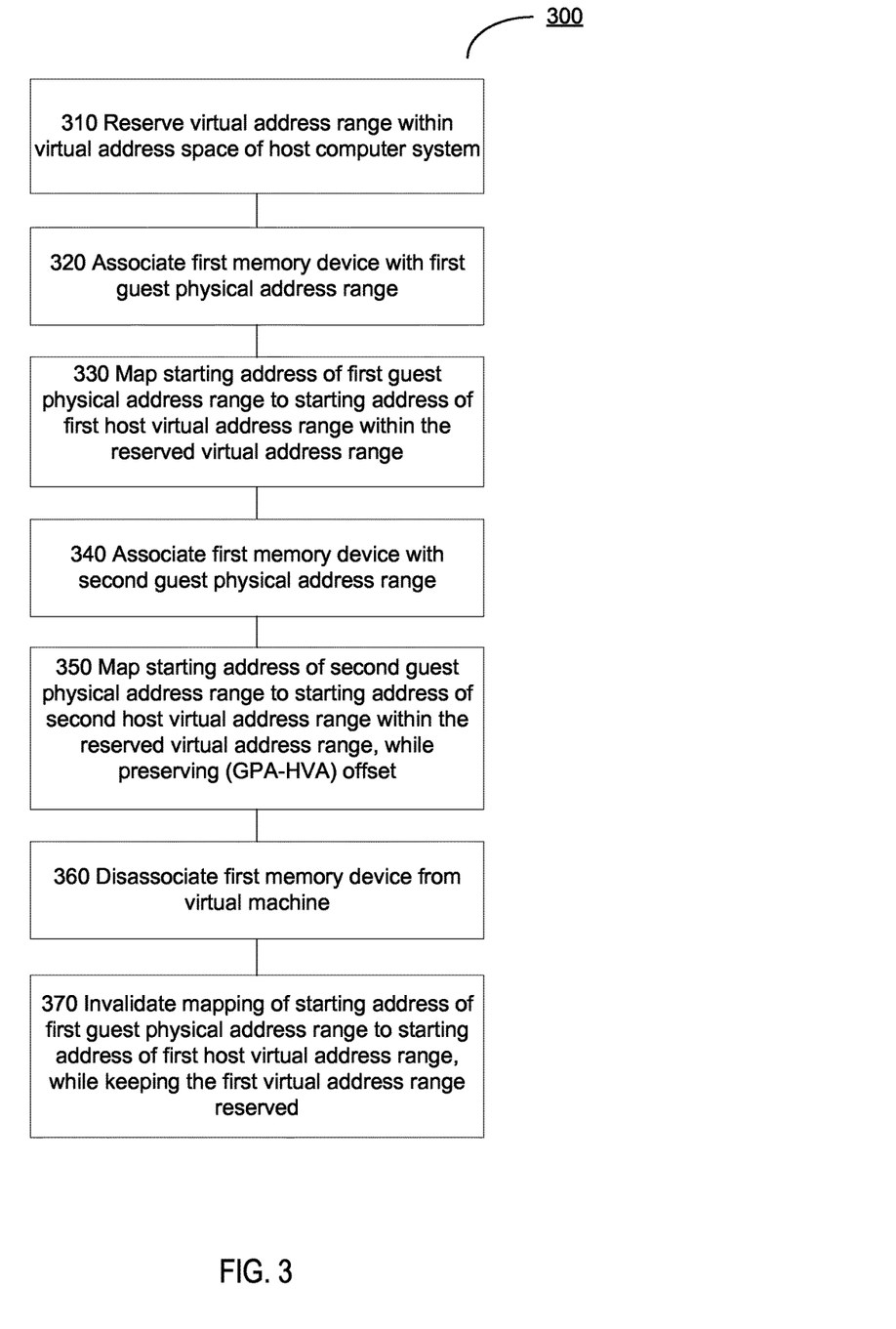
FIG. 3 depicts a flow diagram of a method for host virtual address reservation for guest memory hot-plugging, in accordance with one or more aspects of the present disclosure.

FIG. 3 depicts a flow diagram of one illustrative example of a method 300 for host virtual address reservation for guest memory hot-plugging, in accordance with one or more aspects of the present disclosure. Method 300 and/or each of its individual functions, routines, subroutines, or operations may be performed by one or more processing devices of the computer system (e.g., host computer system 100 of FIG. 1) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a processing device of a host computer system implementing the method may reserve a virtual address range within a virtual address space of a host computer system. Reserving the virtual address range within the virtual address space of the host computer system may be performed without associating a physical memory with at least part of the virtual address range, as described in more details herein above with reference to FIG. 2. In certain implementations, reserving the virtual address range within the virtual address space of the host computer system may be performed using mmap( ) command with MAP_NORESERVE flag.

At block 320, the processing device may associate a first virtual memory device with a first guest physical address range of a physical address space of a virtual machine running on the host computer system.

At block 330, the processing device may map a starting address of the first guest physical address range to a starting address of a first host virtual address range within the reserved virtual address range. The mappings of guest physical addresses to corresponding host virtual addresses may be stored in a memory data structure, such as an extended page table (EPT).

At block 340, the processing device may associate a second virtual memory device with a second guest physical address range of a physical address space of a virtual machine running on the host computer system.

At block 350, the processing device may map a starting address of the second guest physical address range to a starting address of a second host virtual address range within the reserved virtual address range. The mappings of guest physical addresses to corresponding host virtual addresses may be stored in a memory data structure, such as an extended page table (EPT). In accordance with one or more aspects of the present disclosure, address mappings may be performed in a manner providing that the offset of the starting address of the second host virtual address range with respect to the starting address of the second guest physical address range would match the offset of the starting address of the first host virtual address range with respect to the starting address of the first guest physical address range, as described in more details herein above with reference to FIG. 2.

At block 360, the processing device may disassociate the first memory device from the virtual machine.

At block 370, the processing device may invalidate the mapping of the starting address of the first guest physical address range to the starting address of the first host virtual address range, but keep the first virtual address range reserved within the virtual address space of the host computer system.

Upon completing the operations referenced by block 370, the method may terminate.

Figure 4:
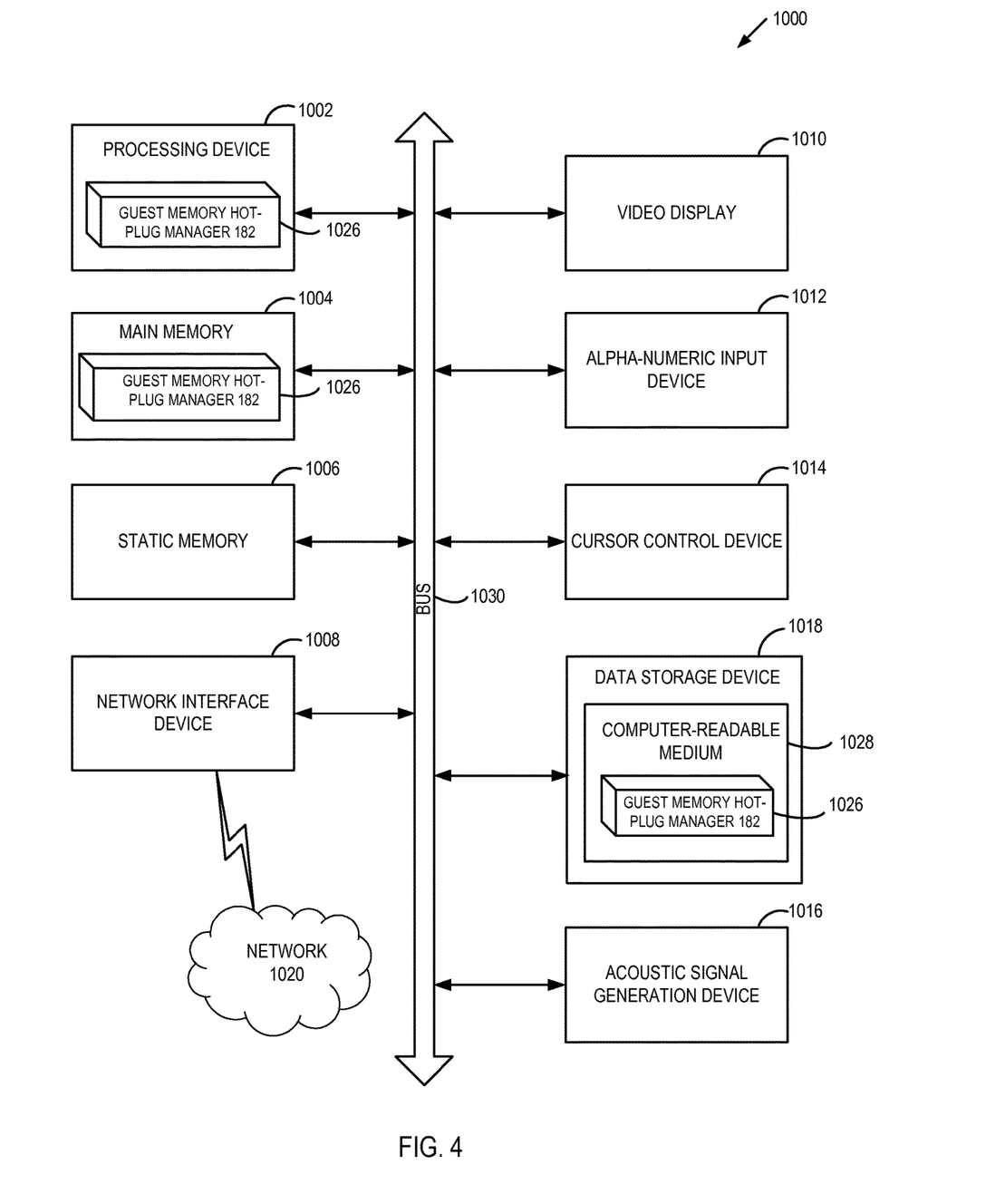
FIG. 4 depicts a block diagram of an example computer system operating in accordance with one or more aspects of the present disclosure.

FIG. 4 schematically illustrates a component diagram of an example computer system 1000 which can perform any one or more of the methods described herein. In various illustrative examples, computer system 1000 may represent host computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute guest memory hot-plug manager component 182 implementing method 300 for host virtual address reservation for guest memory hot-plugging.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of guest memory hot-plug manager component 182 implementing method 300 for host virtual address reservation for guest memory hot-plugging.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
reserving, by a processing device of a host computer system, a host virtual address range within a virtual address space of the host computer system;
associating a first virtual memory device with a first guest physical address range of a physical address space of a virtual machine running on the host computer system;
associating a second virtual memory device with a second guest physical address range of the physical address space of the virtual machine;
mapping a first guest physical address of the first guest physical address range to a first host virtual address of the host virtual address range, wherein the first host virtual address is identified by a first offset with respect to the first guest physical address;
mapping a second guest physical address of the second guest physical address range to a second host virtual address of the host virtual address range, wherein the second host virtual address is identified by a second offset with respect to the second guest physical address, wherein the second offset is equal to the first offset; and
responsive to disassociating the first virtual memory device from the virtual machine, un-mapping the first guest physical address from the first host virtual address while keeping reserved the host virtual address range.

2. The method of claim 1, wherein reserving the virtual address range within the virtual address space of the host computer system is performed without associating a physical memory with at least part of the virtual address range.

3. The method of claim 1, wherein reserving the virtual address range within the virtual address space of the host computer system is performed using MAP_NORESERVE flag.

4. The method of claim 1, wherein mapping the first guest physical address to the host virtual address is performed using a memory data structure.

5. The method of claim 4, further comprising:
translating the guest physical address into the host virtual address using the memory data structure.

6. The method of claim 1, wherein reserving the virtual address range within the virtual address space of the host computer system is performed responsive to starting the virtual machine.

7. A computer system comprising:
a memory; and
a processing device, operatively coupled to the memory, to:
reserve a host virtual address range within a virtual address space of the computer system;
associate a virtual memory device with a guest physical address range of a physical address space of a virtual machine running on the computer system;
map a guest physical address of the guest physical address range to a host virtual address of the host virtual address range, wherein the host virtual address is identified by an offset with respect to the guest physical address, and wherein the offset is employed for mapping, into the virtual address space of the computer system, guest physical addresses associated with two or more virtual memory devices assigned to the virtual machine; and
responsive to disassociating the virtual memory device from the virtual machine, un-map the guest physical address from the host virtual address while keeping reserved the host virtual address range.

8. The system of claim 7, wherein the processing device is to reserve the virtual address range within the virtual address space of the computer system without associating a physical memory with at least part of the virtual address range.

9. The system of claim 7, wherein the processing device is to reserve the virtual address range within the virtual address space of the computer system using MAP_NORESERVE flag.

10. The system of claim 7, wherein the processing device is to map the guest physical address to the host virtual address using a memory data structure.

11. The system of claim 10, wherein the processing device is further to:
translate the guest physical address into the host virtual address using the memory data structure.

12. The system of claim 7, wherein the processing device is to reserve the virtual address range within the virtual address space of the computer system responsive to starting the virtual machine.

13. A computer-readable non-transitory storage medium comprising executable instructions to cause a processing device of a host computer system to:
reserve, by the processing device, a virtual address range within a virtual address space of the host computer system;
associate a virtual memory device with a guest physical address range of a physical address space of a virtual machine running on the host computer system;
map a guest physical address of the guest physical address range to a host virtual address of the host virtual address range, wherein the host virtual address is identified by an offset with respect to the guest physical address, and wherein the offset is employed for mapping, into the virtual address space of the host computer system, guest physical addresses associated with two or more virtual memory devices assigned to the virtual machine; and
responsive to disassociating the virtual memory device from the virtual machine, un-map the guest physical address from the host virtual address while keeping reserved the host virtual address range.

14. The computer-readable non-transitory storage medium of claim 13, wherein the executable instructions cause the processing device to reserve the virtual address range within the virtual address space of the host computer system without associating a physical memory with at least part of the virtual address range.

15. The computer-readable non-transitory storage medium of claim 13, wherein the executable instructions cause the processing device to reserve the virtual address range within the virtual address space of the host computer system using MAP_NORESERVE flag.

16. The computer-readable non-transitory storage medium of claim 13, wherein the executable instructions cause the processing device to map the guest physical address to the host virtual address using a memory data structure.

17. The computer-readable non-transitory storage medium of claim 13, wherein the executable instructions cause the processing device to reserve the virtual address range within the virtual address space of the host computer system responsive to starting the virtual machine.

\* \* \* \* \*